US012271860B2

(12) United States Patent
Pylappan et al.

(10) Patent No.: US 12,271,860 B2
(45) Date of Patent: Apr. 8, 2025

(54) LIMITED LOCATION TRACKING OF A USER DEVICE FOR LOCAL PICKUP

(71) Applicant: RAKUTEN GROUP, INC., Tokyo (JP)

(72) Inventors: Seejo K. Pylappan, Cupertino, CA (US); Jaron I. Waldman, Palo Alto, CA (US)

(73) Assignee: RAKUTEN GROUP, INC., Tokyo (JP)

( * ) Notice: Subject to any disclaimer, the term of this patent is extended or adjusted under 35 U.S.C. 154(b) by 715 days.

(21) Appl. No.: 16/989,773

(22) Filed: Aug. 10, 2020

(65) Prior Publication Data

US 2020/0372461 A1    Nov. 26, 2020

Related U.S. Application Data

(63) Continuation of application No. 14/557,253, filed on Dec. 1, 2014, now Pat. No. 10,740,718.

(51) Int. Cl.
*G06Q 10/0836* (2023.01)
*G06Q 10/0833* (2023.01)
*H04W 4/02* (2018.01)

(52) U.S. Cl.
CPC ..... *G06Q 10/0836* (2013.01); *G06Q 10/0833* (2013.01); *H04W 4/025* (2013.01)

(58) Field of Classification Search
CPC .................................................... H04W 4/025
See application file for complete search history.

(56) References Cited

U.S. PATENT DOCUMENTS

| 8,125,332 B2 | 2/2012 | Curran et al. |
| 8,504,061 B2 | 8/2013 | Grainger et al. |
| 8,587,476 B2 | 11/2013 | Hung et al. |
| (Continued) | | |

FOREIGN PATENT DOCUMENTS

| JP | 2006-166421 A | 6/2006 |
| WO | 2014/150208 A1 | 9/2014 |

OTHER PUBLICATIONS

Cardrops e-commerce delivery in your car dated Nov. 22, 2014 https://web.archive.org/web/20141122004332/http://www.cardrops.com/ (Year: 2014).*

(Continued)

*Primary Examiner* — Rupangini Singh
(74) *Attorney, Agent, or Firm* — Polsinelli PC

(57) ABSTRACT

Exemplary methods, apparatuses, and systems receive an indication that an order associated with a user account is ready for pickup. One or more messages to a user device associated with the user account are transmitted in response to the received indication that the order is ready. The one or more messages include identification of the order as being ready for pickup, a pickup location for the order, and a threshold distance from the pickup location for the order. Location data is received at a limited interval from a user device while the user device is outside of the threshold distance from the pickup location. Location data is received at a more frequent interval than the limited interval while the user device is within the threshold distance. The location data is transmitted to a local pickup device to trigger an alert when the user device is approaching the pickup location.

20 Claims, 5 Drawing Sheets

(56) References Cited

U.S. PATENT DOCUMENTS

| | | | |
|---|---|---|---|
| 8,750,895 | B2 | 6/2014 | Grosman et al. |
| 9,904,903 | B1* | 2/2018 | Weiss ................. G06Q 10/0836 |
| 2002/0128850 | A1 | 9/2002 | Chen et al. |
| 2003/0148771 | A1 | 8/2003 | De Verteuil |
| 2005/0205719 | A1* | 9/2005 | Hendrickson ....... B61L 15/0081 246/122 R |
| 2009/0312032 | A1 | 12/2009 | Bornstein et al. |
| 2012/0296686 | A1 | 11/2012 | Fugman et al. |
| 2013/0093627 | A1 | 4/2013 | Cosman |
| 2013/0130718 | A1* | 5/2013 | Sharma ................. H04W 4/026 455/456.3 |
| 2013/0151357 | A1 | 6/2013 | Havas et al. |
| 2013/0226651 | A1* | 8/2013 | Napper .............. G06Q 20/3224 701/527 |
| 2013/0295955 | A1 | 11/2013 | Sheshadri et al. |
| 2014/0057648 | A1 | 2/2014 | Lyman et al. |
| 2014/0278603 | A1 | 9/2014 | Lievens et al. |
| 2014/0279270 | A1* | 9/2014 | Bertanzetti ........ G06Q 30/0635 705/26.81 |
| 2014/0379390 | A1 | 12/2014 | Scarborough |
| 2014/0379529 | A1* | 12/2014 | Agasti ..................... H04W 4/12 705/26.81 |
| 2016/0116596 | A1* | 4/2016 | Rajala ................ G08B 21/0269 342/357.54 |
| 2019/0049263 | A1 | 2/2019 | Waldman et al. |
| 2019/0342704 | A1 | 11/2019 | Pylappan et al. |
| 2019/0342716 | A1 | 11/2019 | Pylappan et al. |
| 2019/0342718 | A1 | 11/2019 | Pylappan et al. |

OTHER PUBLICATIONS

Apple Inc., "Location and Maps Programming Guide", Developer, Mar. 10, 2014, pp. 1-89.
Carddrops, "Cardrops E-Commerce Delivery in Your Card", Available Online at <https://web.archive.org/web/20141122004332/http://www.cardrops.com/>, Nov. 22, 2014, 5 pages.
Final Office Action, U.S. Appl. No. 14/557,253, Nov. 15, 2018, 31 pages.
Final Office Action, U.S. Appl. No. 14/557,253, Sep. 19, 2019, 30 pages.
International Preliminary Report on Patentability, PCT App. No. PCT/US2015/063250, Jun. 15, 2017, 8 pages.
International Search Report and Written Opinion, PCT App. No. PCT/US2015/063250, Mar. 31, 2016, 12 pages.
Non-Final Office Action, U.S. Appl. No. 14/557,253, Apr. 19, 2018, 27 pages.
Non-Final Office Action, U.S. Appl. No. 14/557,253, Mar. 7, 2019, 22 pages.
Notice of Allowance, U.S. Appl. No. 14/557,253, Apr. 3, 2020, 18 pages.
Square (News and Press Releases, "Square Introduces New Way to Order Your Daily Coffee", Available Online at <https://squareup.com/news/order-2-0>, Oct. 8, 2014, 6 pages.
Square, Inc., "Mobile Ordering from Local Cafes and Restaurants", Available Online at <https://itunes.apple.com/us/app/id873401154?mt=8>, retrieved on Oct. 13, 2014, 3 pages.

* cited by examiner

LIMITED LOCATION TRACKING OF A USER DEVICE FOR LOCAL PICKUP

CROSS-REFERENCE TO RELATED APPLICATIONS

This application is a continuation of U.S. patent application Ser. No. 14/557,253, filed Dec. 1, 2014, which is hereby incorporated by reference FIELD The various embodiments described herein relate to limited tracking of a user device for local pickup. In particular, the embodiments relate to a local pickup shopping platform, in response to receiving an indication of a pickup being ready, triggering a user device's sharing of location data at a limited interval when outside of a threshold distance from a pickup location and at a more frequent interval when within the threshold distance.

BACKGROUND

Online shopping extends the basic concepts of mail order shopping to the Internet. A user selects an item from a catalogue, places an order, and receives delivery of the ordered item via the mail. Waiting for delivery, paying for postage, and/or being physically present to receive some orders, however, may be too much of a burden for the purchase of a number of goods. In addition to or in lieu of delivery, some businesses allow users to order items for pickup at a local store. For example, a website may enable a user to search for and select a store location, place an order for an item, and pickup the order by presenting a printed copy of a receipt, a credit card, etc.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein facilitate limited tracking of a user device for preparing an order for local pickup. For example, a local pickup platform transmits one or more messages to a user device in response to receiving indication that an order is ready. The one or more messages include identification of the order, a pickup location for the order, and a threshold distance from the pickup location for the order. Location data is received at a limited interval from a user device while the user device is outside of the threshold distance from the pickup location. Location data is received at a more frequent interval than the limited interval while the user device is within the threshold distance. The location data is transmitted to a local pickup device to trigger an alert when the customer is approaching. As a result, the local pickup shopping platform is able to alert a pickup associate that an authorized user is approaching and the order should be readied for pickup, e.g., at a curbside location. Additionally, the local pickup shopping platform attempts to minimize tracking the user device location to conserve user device power and processing resources while providing the authorized user more privacy than with persistent location tracking.

Figure 1:
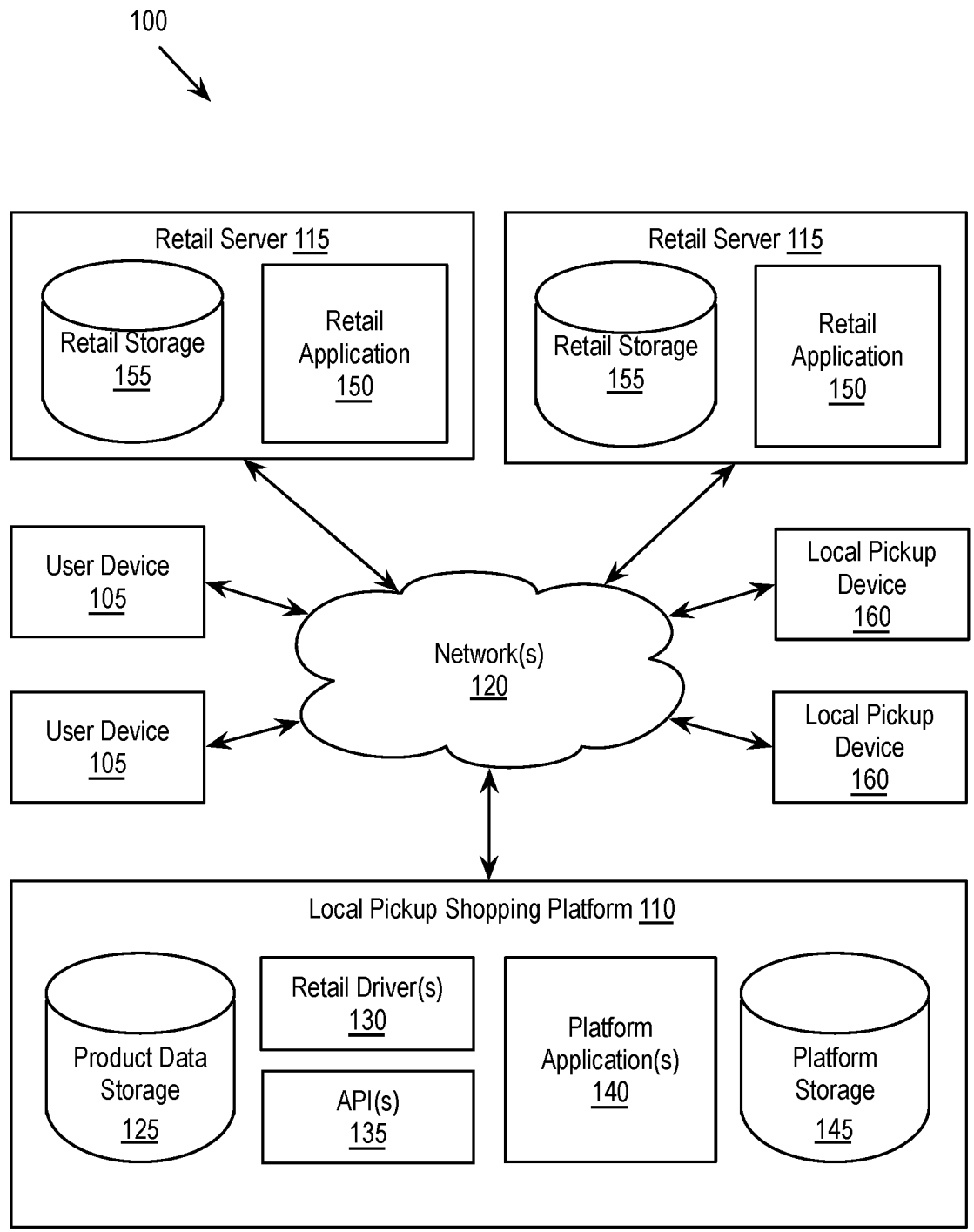
FIG. 1 illustrates, in block diagram form, an exemplary local pickup shopping network.

FIG. 1 illustrates, in block diagram form, exemplary local pickup shopping network 100. Local pickup shopping network 100 includes user devices 105, local pickup shopping platform 110, retail server(s) 115, and local pickup device(s) 160 coupled to one or more networks 120. A user interacts with the local pickup shopping platform 110 using a user device 105, such as a personal computer, tablet, or a mobile phone. For example, a user device 105 communicates with local pickup shopping platform 110 via an application such as a web browser or dedicated application. As described further herein, typical interactions between a user device 105 and local pickup shopping platform 110 include a user device 105 browsing items available for ordering and local pickup as presented by local pickup shopping platform 110, submitting an order to local pickup shopping platform 110, being notified by local pickup shopping platform 110 that an order is ready for pickup, receiving local pickup and location sharing information parameters from local pickup shopping platform 110, transmitting infrequent and frequent location updates to location pickup shopping platform 110 based upon a proximity of the user device 105 to the pickup location, etc.

Local pickup shopping platform 110 includes product data storage 125, retail drivers 130, one or more application programming interfaces (API's) 135, one or more platform application(s) 140, and platform storage 145. Product data storage includes an index of products that may be ordered by users. For example, the product index may include product names, product categories, product descriptions, product images, stores that offer the product, product pricing (e.g., at each store), an estimated inventory of the product (e.g., at each store), an order history of products over time (e.g., a time series of products ordered by store/location), etc.

Local pickup shopping platform 110 utilizes retail drivers 130 to obtain product index data. For example, each retailer may provide a different interface by which product index data is obtained and orders are fulfilled. Exemplary retailer interfaces include a consumer-facing website that presents inventory available at physical store locations, a database or other data storage that is either directly accessible or indirectly accessible to business partners, and/or a product data feed pushed via retail application 150 and/or retail storage 155. As a result, platform application 140 may request product index data in a uniform manner and retail drivers 130 process the requests in a manner that is specific to individual retail servers 115. In one embodiment, local pickup shopping platform 110 utilizes a driver 130 to crawl one or more retail websites to obtain product index data. In another embodiment, local pickup shopping platform 110 utilizes a driver 130 to download and parse a file storing the product index data.

One or more APIs 135 enable a client application running on user device 105 to query or otherwise access product data storage 125 and platform storage 145. For example, user device 105 may submit requests to platform application 140 via API 135 to browse, search for, and order products available for local pickup. Exemplary requests may include a location (e.g., to determine nearby businesses), product name search terms, product category search terms, business name/category search terms, selection of a product/category/business, etc. In response to these requests, platform application 140 provides user device 105 with images and/or descriptions of products based upon estimated and/or actual inventory data from product data storage 125.

Additionally one or more APIs 135 enable local pickup device 160 to query or otherwise access product data storage 125 and platform storage 145. For example, local pickup device 160 may communicate with platform application 140 via API 135 to determine which orders are ready, update order readiness status, request/receive location updates for user device 105, and confirm pickup of an order.

In one embodiment, one or more platform applications 140 manage the submission of orders and the collection of product index data, e.g., via commands passed to retail drivers 130. Additionally, platform application(s) 140 manage communications with user devices 105, e.g., to present product index data via API(s) 135. Platform application(s) 140 further manage communications with local pickup device(s) 160 as described herein with reference to FIGS. 2 and 4.

Platform storage 145 stores user account data. Exemplary user account data includes user preferences/settings, user profile data, user order history data, user payment data, etc.

Figure 2:
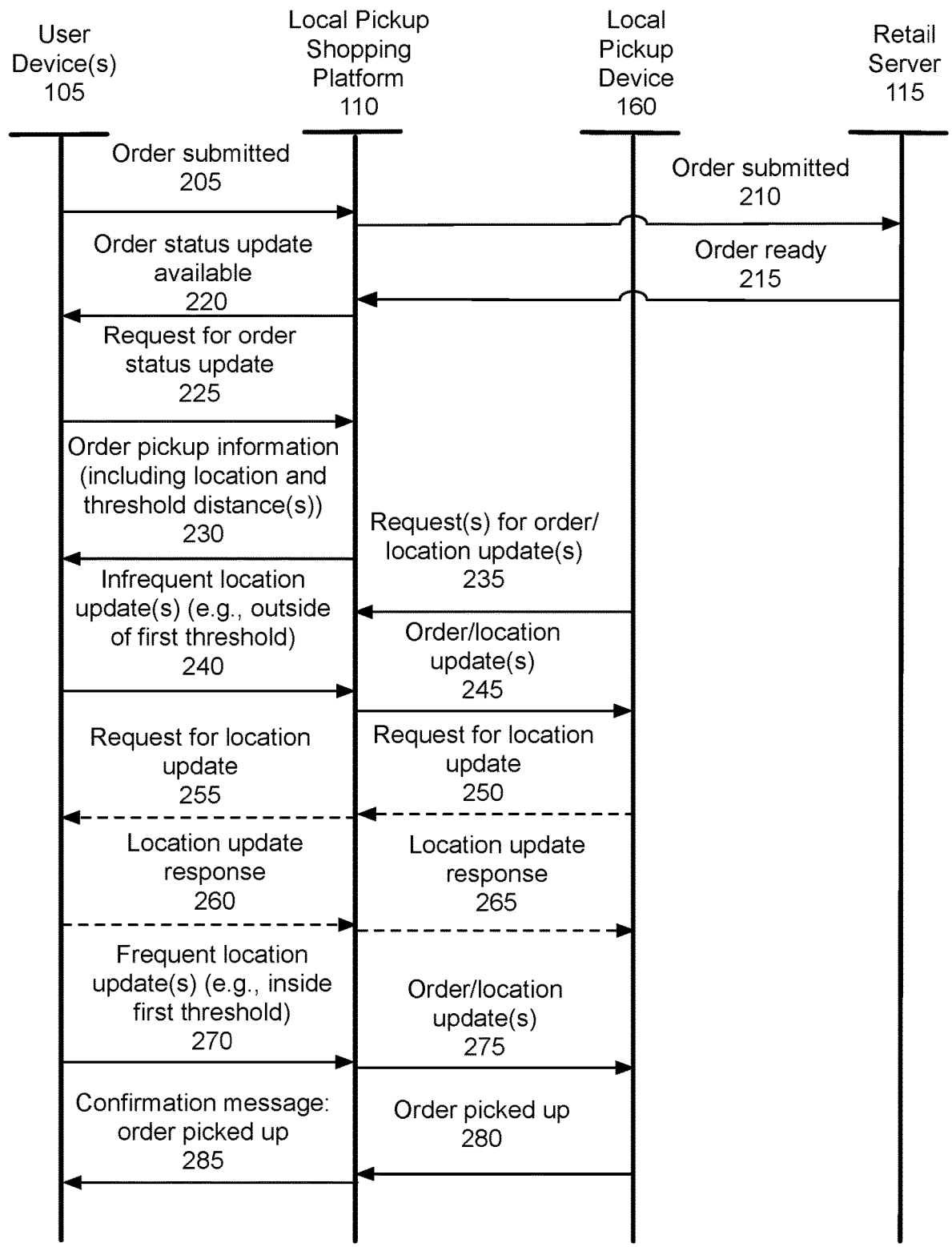
FIG. 2 illustrates an exemplary exchange between devices within the local pickup shopping network to facilitate limited tracking of a user device for local pickup.

FIG. 2 illustrates exemplary exchange 200 between devices within the local pickup shopping network 100 to facilitate limited tracking of a user device for local pickup. During the exchange, a user device 105 submits an order 205 to local pickup shopping platform 110. For example, user device 105 communicates with local pickup shopping platform 110 as described further herein to enable user browsing of items available for ordering and local pickup. User selection of an item for purchase results in user device 105 submitting an order for the item to local pickup shopping platform 110.

In response to receiving an order from user device 105, local pickup shopping platform 110 submits the order 210 to the retailer. For example, local pickup shopping platform 110 selects a retail driver 135 corresponding to the retailer associated with the submitted order and submits the order to retail server 115 via the selected retail driver 135.

Retail server 115 processes the order and sends confirmation of the completion of the order 215 to local pickup shopping platform 110. In one embodiment, completion of the order includes processing payment for the order. In one embodiment, completion of the order further includes notifying local pickup shopping platform 110 that the order is ready for pickup. In an alternate embodiment, local pickup device 160 notifies local pickup shopping platform 110 when the order is ready for pickup. For example, a retail associate may utilize local pickup device 160 to notify local pickup shopping platform 110 that the order is ready when the purchased item has been delivered to a pickup location within or near the business. In one embodiment, the pickup location is a drive through window, curbside, or parking lot pickup area at the business.

In response to receiving an indication that the order is ready, local pickup shopping platform 110 transmits one or more messages to one or more user devices 105 associated with the account for the order. For example, local pickup shopping platform 110 maps the order to the user device(s) 105 associated with the account used to place the order. In one embodiment, a user may grant temporary or permanent permission for multiple user devices 105 to pickup orders associated with a single account. As a result, the message(s) may be transmitted to a primary user device with the option to select/designate another user device to be used for pickup, to a user device previously designated for pickup of the corresponding order, or to multiple user devices associated with the account to enable the users to determine which among them will pickup the order (e.g., by being the first to respond to the one or more messages).

In one embodiment, local pickup shopping platform 110 transmits a first message 220 to the one or more user devices 105 to indicate an update of order status or otherwise request that the user device(s) 105 respond for an update of order status. As described above, this may enable a user to designate which user device 105 is to respond and be used for limited tracking in the pickup process. Alternatively, another user device 105 may be designated at a later point in the pickup process. Additionally, the request for a user device 105 to respond allows local pickup shopping platform 110 to bundle multiple order status updates, if applicable, while awaiting the response from the user device 105. For example, the user account may have been used to place orders with multiple businesses. In response to the first message, user device 105 transmits a request 225 for any pending order status updates associated with the corresponding user account and/or device identifier.

In one embodiment, local pickup shopping platform 110 transmits a second message 230 (or, alternatively, a single message 230) to the one or more user devices 105 including an identification of one or more orders, the pickup location of each order, and one or more threshold distances from the pickup location of each order. For example, local pickup shopping platform 110 may transmit latitude and longitude values for the pickup location and a distance to be used as radius from the latitude and longitude values as a first threshold distance from the pickup location.

In one embodiment, the first threshold distance indicates a boundary outside of which user device 105 is to share its location infrequently and inside of which user device 105 is to share its location more frequently. For example, location updates may be shared periodically and/or based upon a change in location. In one embodiment, infrequent location updates are shared in intervals of one or more minutes (e.g., 5 minutes) or when the location of user device 105 has changed by a significant amount (e.g., 500 meters). In one embodiment, frequent location updates are shared in intervals of one or more seconds (e.g., every second) and/or based upon any detectable change in location of user device 105.

In one embodiment, the message includes a second threshold distance. For example, the second threshold distance may indicate a boundary outside of which user device 105 is not to share its location and inside of which user device 105 is to share its location infrequently as described above. Alternatively, the second threshold distance may indicate a boundary outside of which user device 105 is not to push its location but may respond to a request for a location update from local pickup shopping platform 110. In yet another embodiment, the second threshold distance may indicate a boundary outside of which user device 105 is to share its location less than the infrequent interval described above (e.g., once or twice an hour). An exemplary set of threshold distances used to facilitate limited tracking of user device 105 is described further with reference to FIG. 3.

In one embodiment, local pickup device 160 requests order and/or location updates 235 for one or more orders. For example, local pickup device(s) 160 may request a location update of user device(s) 105 with orders ready for pickup. In one embodiment, local pickup device(s) 160 request order updates periodically (e.g., every 5 seconds). For example, local pickup device 160 may request an order update following the submission of the order 210 and prior to the order being ready 215. Local pickup shopping platform 110 responds to the request at this time with an indication of the new order with a pending status. Additionally, local pickup device 160 may request an order update following the order being ready 215 and prior to local pickup shopping platform 110 receiving location updates. Local pickup shopping platform 110 responds to the request at this time with an indication of an order being ready but awaiting location data for user device 105. Alternatively, local pickup shopping platform 110 pushes updates to local pickup device(s) 160 (e.g., without one or more requests 235).

User device 105 determines its location using a global positioning system (GPS), assisted GPS (A-GPS), cellular tower data (e.g., nearest tower, triangulation, etc.), wireless network data (e.g., a listing of known Wi-Fi network connections within geographical areas), or a combination thereof. For example, user device 105 may determine that it is outside of a first threshold distance from a pickup location (and, optionally, within a second threshold distance) based upon latitude and longitude values determined by the user device GPS and/or latitude and longitude values associated with a wireless network signal received by user device 105.

In one embodiment, user device 105 determines its location in response to receiving order pickup information 230. Additionally, or alternatively, user device 105 determines its location periodically. For example, user device 105 may determine its location in response to receiving order pickup information 230. If the location is outside of the first threshold distance, user device 105 determines its location at the infrequent interval described above. If the location is inside of the first threshold distance, user device 105 determines its location at the more frequent interval described above. Alternatively, user device 105 determines its location more frequently, e.g., regardless of its current location.

With the location of user device 105 determined, user device 105 transmits infrequent location updates 240 to local pickup shopping platform 110. For example, when the location of user device 105 is outside of the first threshold distance, user device 105 transmits its location to local pickup shopping platform 110 at the infrequent interval. As described above, infrequent location updates may be shared in intervals of one or more minutes (e.g., 5 minutes) or when the location of user device 105 has changed by a significant amount (e.g., 500 meters). When the location is inside of the first threshold distance, user device 105 transmits its location to local pickup shopping platform 110 at the more frequent interval. As described above, frequent location updates are shared in intervals of one or more seconds (e.g., every second) and/or based upon any detectable change in location of user device 105.

In one embodiment, in response to request(s) 235 from local pickup device 160, local pickup shopping platform 110 sends order and location update(s) 245. For example, local pickup shopping platform 110 sends location update for user device 105 based upon the infrequent location updates 240 received from user device 105. Additionally, local pickup shopping platform 110 may send the status of any additional orders (pending, ready, etc.) as well as location updates for other user devices. In another embodiment, local pickup shopping platform 110 pushes location update(s) 245, e.g., without a need for request(s) 235.

In one embodiment, local pickup device 160 transmits a request 250 to local pickup shopping platform 110 for a location update from a user device 105. In response, local pickup shopping platform 110 transmits a request 255 to the user device 105 to request an update on the current location of user device 105. Alternatively, local pickup shopping platform 110 transmits request 255 without receiving a request 250 from local pickup device 160. In response to request 255, user device 105 transmits a location update 260 to local pickup shopping platform 110. In one embodiment, local pickup shopping platform 110 transmits the updated location 265 to local pickup device 160. For example, if an order has been ready and not picked up for more than a threshold period of time or in response to user input, local pickup device 160 and/or local pickup shopping platform 110 initiates a request for a location update from user device 105. As a result, local pickup shopping network 100 can determine a location of user device 105, when user device 105 is not sharing infrequent or frequent location updates (e.g., when outside of a threshold distance) or in between infrequent location updates.

As user device 105 determines its location, user device 105 compares its determined location to the threshold distance(s) received within order pickup information 230. For example, when the location remains outside of the first threshold distance, user device 105 transmits its location to local pickup shopping platform at the infrequent interval. Once user device 105 determines its location is within the first threshold distance (e.g., as user device moves towards the pickup location), user device 105 changes the update frequency and transmits more frequent location updates 270 to local pickup shopping platform 110.

In one embodiment, in response to request(s) 235 from local pickup device 160, local pickup shopping platform 110 sends order and location update(s) 275. For example, local pickup shopping platform 110 sends location update for user device 105 based upon the more frequent location updates 270 received from user device 105. In another embodiment, local pickup shopping platform 110 pushes location update(s) 275, e.g., without a need for request(s) 235.

In one embodiment, local pickup device 160 utilizes location updates 245 and 275 to display distances of user device 105. For example, local pickup device 160 may determine a distance between user device 105 and the pickup location/location of local pickup device 160. Additionally, local pickup device 160 may display one or more orders ready for pickup and the corresponding distances determined based upon the location updates.

In one embodiment, local pickup device 160 uses the location updates 275 to determine when user device 105 is approaching the pickup location. For example, local pickup device 160 may use a third threshold distance from the pickup location as an indication of when user device 105 is approaching. Local pickup device 160 compares the received location updates 245 to the third threshold distance to determine when user device 105 is approaching. Alternatively, user device 105 or local pickup shopping platform 110 uses the location of user device 105 to determine when user device 105 is within the third threshold distance and transmits a notification to local pickup shopping platform 110 and/or local pickup device 160. In one embodiment, local pickup device 160 generates an alert (e.g., audio and/or visual alert) when user device 105 is within the third threshold distance to notify a local pickup associate that user device 105 is approaching. As a result, the local pickup associate can ready the corresponding order to expedite the pickup process. In one embodiment, additional location tracking is used when user device is within the threshold distance, e.g., as described with reference to FIG. 4.

Once the order has been picked up, local pickup device 160 transmits a pickup confirmation message 280 to local pickup shopping platform 110. For example, local pickup device 160 may receive input from a local pickup associate to confirm the pickup of the order and, in response to the input, local pickup device 160 transmits message 280 to local pickup shopping platform 110. Additionally, local pickup shopping platform 110 transmits confirmation message 285 to the one or more user device(s) 105 associated with the order account to confirm a user has picked up the order.

Figure 3:
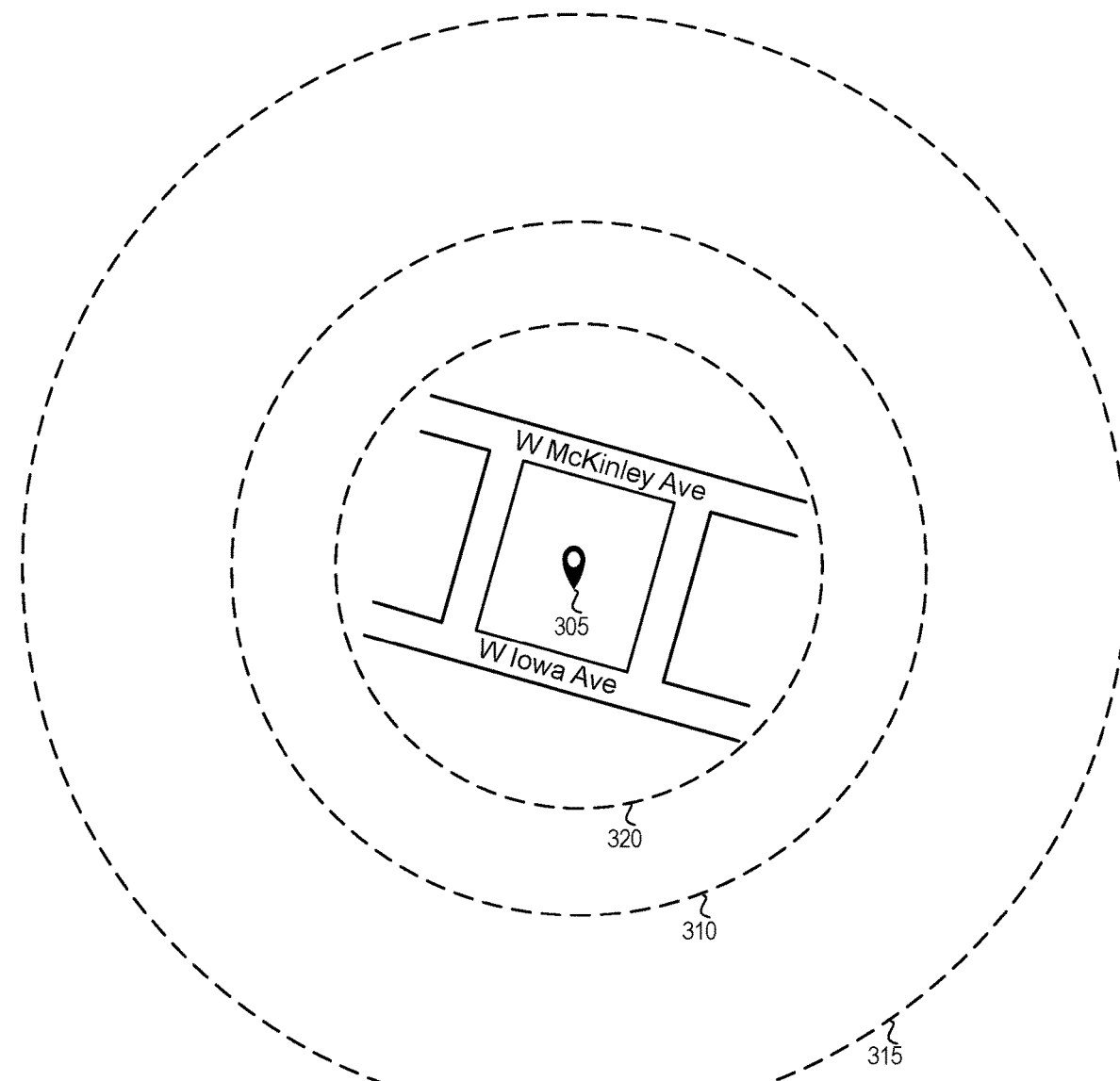
FIG. 3 illustrates an exemplary set of threshold distances used to facilitate limited tracking of a user device for local pickup.

FIG. 3 illustrates an exemplary set of threshold distances used to facilitate limited tracking of a user device for local pickup. As described above, devices within local pickup shopping network 100 may utilize one or more threshold distances from pickup location 305 to facilitate limiting tracking of user device 105. In one embodiment, local pickup shopping platform 110 transmits a first threshold distance to user device 105. For example, the first threshold distance may be approximately 800 meters from pickup location 305. In one embodiment, user device 105 uses the first threshold distance as a radius from pickup location 305 to determine boundary 310. Outside of boundary 310, user device 105 shares its location with local pickup shopping platform 110 infrequently. Inside of boundary 310, user device 105 shares its location with local pickup shopping platform 110 more frequently.

In one embodiment, local pickup shopping platform 110 also transmits a second threshold distance to user device 105. For example, the second threshold distance may be approximately 5 kilometers from pickup location 305. In one embodiment, user device 105 may use the second threshold distance as a radius from pickup location 305 to determine boundary 315. Inside of boundary 315 (and outside of boundary 310), user device 105 shares its location with local pickup shopping platform 110 infrequently. In one embodiment, outside of boundary 315, user device 105 does not share its location with local pickup shopping platform 110. Alternatively, outside of boundary 315, user device 105 does not push location updates to local pickup shopping platform 110, but user device 105 but may respond to individual requests for a location update from local pickup shopping platform 110. In yet another embodiment, outside of boundary 315, user device 105 shares its location with local pickup shopping platform 110 less than the infrequent interval described above.

In one embodiment, local pickup device 160 utilizes a third threshold distance from pickup location 305. For example, the third threshold distance may be approximately 300 meters from pickup location 305. In one embodiment, local pickup device 160 may use the third threshold distance as a radius from pickup location 305 to determine boundary 320. If local pickup device 160 determines user device 105 is within boundary 320, local pickup device 160 generates an alert to notify a local pickup associate that the corresponding order should be prepared for pickup.

In one embodiment, one or more of the threshold distances are dependent upon the density of businesses/residences in proximity to pickup location 305. Smaller threshold distances may be better suited for areas of greater density as a result of a higher likelihood of users being within proximity to pickup location 305 for purposes other than picking up a corresponding order. As a result of using one or more smaller threshold distance(s), users in an area of greater density are still afforded some privacy in their location data and able to conserve processing and battery resources when location tracking is not as useful.

While boundaries 310-320 are illustrated and described as circles, different boundaries may be used to facilitate limited tracking of user device 105. For example, boundary 310 may be implemented as a combination of boundary streets or any arbitrary shape defined by latitude and longitude points.

Figure 4:
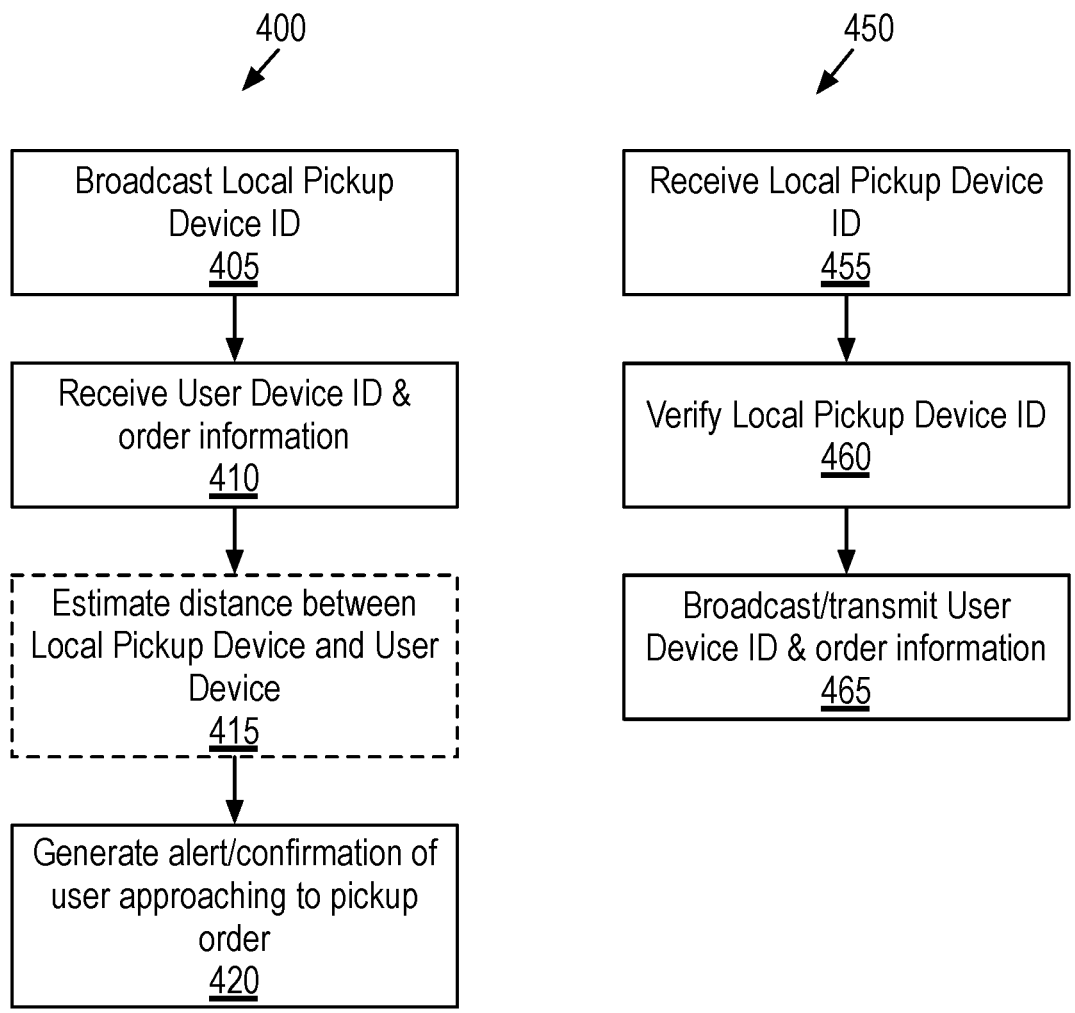
FIG. 4 is a set of flow charts illustrating exemplary methods to facilitate limited tracking of a user device for local pickup.

FIG. 4 is a set of flow charts illustrating exemplary methods 400 and 450 to facilitate limited tracking of a user device for local pickup within close proximity to a pickup location. In one embodiment, local pickup device 160 and user device 105 execute methods 400 and 450, respectively, to communicate via a peer-to-peer connection. For example, local pickup device 160 and user device 105 may transmit and receive messages from one another using wireless technology such as Bluetooth, Bluetooth Low Energy, another protocol based upon or related to IEEE 802.15, a protocol based upon IEEE 802.11, etc.

Method 400 is executed by local pickup device 160. At block 405, local pickup device 160 broadcasts an identifier for local pickup device 160. For example, local pickup device 160 may broadcast its identifier periodically (e.g., every n seconds) to alert devices within range of the presence of local pickup device 160. In one embodiment, local pickup device 160 broadcasts the identifier over a range of approximately 100 meters.

At block 410, local pickup device 160 receives a response from a user device 105 to the broadcast. The received response includes an identifier of user device 105 and order information. For example, the order information may include one or more of an identification of the user account that placed the order, an identification of the user account designated to pickup the order, and an order number or other identification of the order.

At block 415, local pickup device 160 optionally estimates a distance between local pickup device 160 and user device 105. For example, when local pickup device 160 receives the response from user device 105, local pickup device 160 uses the signal strength of the response to estimate the proximity of user device 105 and the accuracy of the estimated proximity. In one embodiment, the signal strength, or received signal strength indication (RSSI), is a measurement of the power present in a radio signal received as a response from user device 105. The stronger the signal, the more confident local pickup device 160 can be about the proximity of user device 105. The weaker the signal, the less confident local pickup device 160 is about the proximity of user device 105.

At block 420, local pickup device 160 generates an alert or confirmation of user device 105 approaching to pickup the corresponding order. In one embodiment, local pickup device 160 generates the alert when user device 105 is detected via the received response or when local pickup device 160 determines user device 105 to be within a fourth threshold distance, e.g., as estimated in block 415. In one embodiment, local pickup device 160 displays the estimated distance between local pickup device 160 and user device 105. Additionally, local pickup device 160 may repeat method 400 to continually update the estimation of distance between local pickup device 160 and user device 105. As the estimated distance is updated, local pickup device 160 may update and/or trigger the alert/displayed distance. In one embodiment, the estimation of distance is accurate within a margin of error of approximately one meter or less. As a result, local pickup device 160 is able to detect when user device 105 is within a meter or two of local pickup device 160. The estimation of close proximity may assist a local pickup associate in confirming the identity of a person picking up the order.

Method 450 is executed by user device 105. At block 455, user device 105 receives the broadcast of the identifier of local pickup device 160. At block 460, user device 105 verifies the received identifier. For example, user device 105 may receive a copy of the identifier of local pickup device 160 with the order pickup information 230 or otherwise store a copy of the identifier as a part of a dedicated client application and compare the received identifier with the stored copy of the identifier. At block 465, user device 105 responds to the verified broadcast from local pickup device 160 by transmitting an identifier of user device 105 and order information. As described above, the order information may include one or more of an identification of the user account that placed the order, an identification of the user account designated to pickup the order, and an order number or other identification of the order. In one embodiment, the response from user device 105 is short in duration. For example, user device 105 may transmit the response including the identifier of user device 105 and the order information for a period of approximately 5-10 seconds.

In one embodiment, user device 105 repeats method 450 each time the broadcast of device identifier is detected to enable local pickup device 160 to update the estimation of proximity described above.

Figure 5:
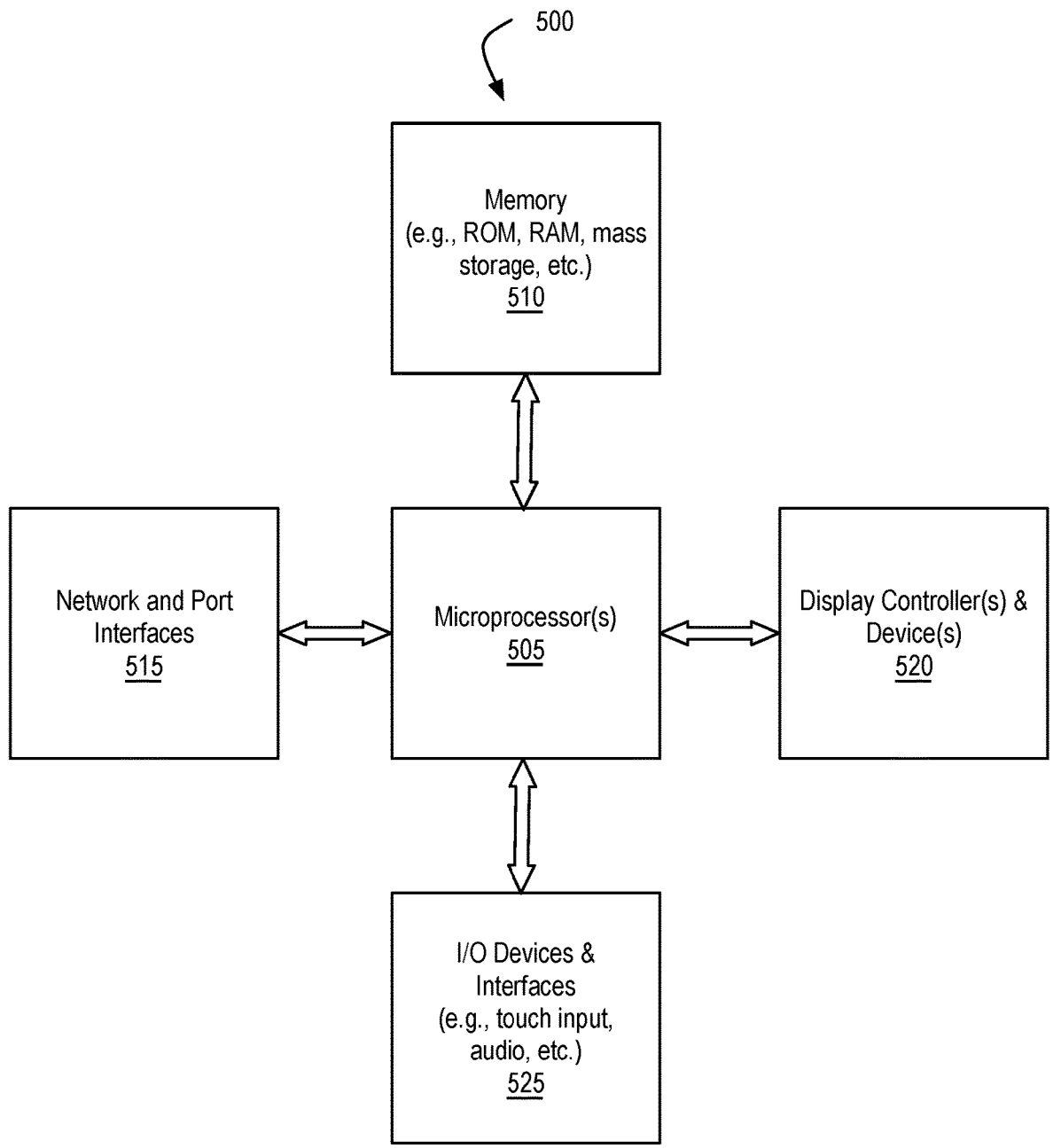
FIG. 5 illustrates, in block diagram form, an exemplary processing system to facilitate limited tracking of a user device for local pickup.

FIG. 5 illustrates, in block diagram form, exemplary processing system 500 to facilitate limited tracking of a user device for local pickup. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, a GPS transceiver/transponder, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 5.

Data processing system 500 is an exemplary representation of one or more of user device(s) 105, local pickup shopping platform 110, retail server 115, and local pickup device 160 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

Additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented methods illustrated in FIGS. 2 and 4 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   receiving an indication that a first order associated with a user account is ready for pickup;
   transmitting one or more messages to user devices associated with the user account in response to the received indication that the first order is ready, the one or more messages including an identification of the first order as being ready for pickup, a pickup location for the first order, a first threshold distance from the pickup location, and a second threshold distance from the pickup location;
   receiving, as part of a response to the one or more messages, a designation of a first user device from among the user devices for tracking to the pickup location for picking up the order;
   receiving first location data at a limited interval from the first user device in response to the first user device determining that the first user device is outside of the first threshold distance from the pickup location and within the second threshold distance from the pickup location, wherein no location data is received from the first user device while the first user device is outside of the second threshold distance, wherein the limited interval at which the first location data is received is based on detecting a threshold change in a location of the first user device while the first user device is outside of the first threshold distance and within the second threshold distance;
   receiving second location data at a more frequent interval than the limited interval in response to the first user device determining that the first user device is within the first threshold distance, wherein a periodicity of the more frequent interval at which the second location data is received is modified based on a threshold change in a location of the first user device inside the first threshold; and
   transmitting the second location data to a local pickup device to trigger an alert in response to receiving an indication that the first user device is approaching the pickup location.

2. The computer-implemented method of claim 1, wherein the one or more messages include a first message to the user devices indicating an update of order status, the method further comprising:
   receiving a request from one of the user devices for orders that are ready for pickup, wherein the identification of the first order, the pickup location, and the first threshold distance are transmitted in a second message in response to the request.

3. The computer-implemented method of claim 2, wherein the second message transmitted in response to the request further includes an identification of a second order as being ready for pickup, a pickup location for the second order, and a second threshold distance from the pickup location for the second order.

4. The computer-implemented method of The computer-implemented method of
   wherein the transmitting of the second location data to the local pickup device is in response to one or more requests for location updates from the local pickup device.

5. The computer-implemented method of claim 1, further comprising:
   receiving the first order from a second user device of the user devices;
   receiving a request from the second user device to grant permission to the first user device to be used to pick up the first order.

6. The computer-implemented method of claim 5, wherein the identification of the first order as being ready for pickup and the first threshold distance are transmitted to the first user device.

7. The computer-implemented method of claim 1, further comprising:
   receiving notification from the local pickup device that the order has been picked up; and
   transmitting a message to one of the user devices confirming that the order has been picked up.

8. A non-transitory computer-readable medium storing computer-readable instructions which, when executed by one or more processors of a processing device, cause the processing device to:
   receive an indication that a first order associated with a user account is ready for pickup;
   transmit one or more messages to user devices associated with the user account in response to the received indication that the first order is ready, the one or more messages including an identification of the first order as being ready for pickup, a pickup location for the first order, a first threshold distance from the pickup location for the first order, and a second threshold distance from the pickup location;
   receive, as part of a response to the one or more messages, a designation of a first user device from among the user devices for tracking to the pickup location for picking up the order;
   receive first location data at a limited interval from the first user device in response to the first user device determining that the first user device is outside of the first threshold distance from the pickup location and within the second threshold distance from the pickup location, wherein no location data is received from the first user device while the first user device is outside of the second threshold distance, wherein the limited interval at which the first location data is received is based on detecting a threshold change in a location of the first user device while the first user device is outside of the first threshold distance and within the second threshold distance;

receive second location data at a more frequent interval than the limited interval in response to the first user device determining that the first user device is within the first threshold distance, wherein a periodicity of the more frequent interval at which the second location data is received is modified based on a threshold change in a location of the first user device inside the first threshold; and transmit the second location data to a local pickup device to trigger an alert in response to receiving an indication that the first user device is approaching the pickup location.

9. The non-transitory computer-readable medium of claim 8, wherein the one or more messages include a first message to the user devices indicating an update of order status, and the execution of the computer-readable instructions by the one or more processors further cause the processing device to receive a request from one of the user devices for orders that are ready for pickup, wherein the identification of the first order, the pickup location, and the first threshold distance are transmitted in a second message in response to the request.

10. The non-transitory computer-readable medium of claim 9, wherein the second message transmitted in response to the request further includes an identification of a second order as being ready for pickup, a pickup location for the second order, and a second threshold distance from the pickup location for the second order.

11. The non-transitory computer-readable medium of claim 8, wherein the transmitting of the second location data to the local pickup device is in response to one or more requests for location updates from the local pickup device.

12. The non-transitory computer-readable medium of claim 8, wherein the execution of the computer-readable instructions by the one or more processors further cause the processing device to:
receive the first order from a second user device of the user devices;
receive a request from the second user device to grant permission to the first user device to be used to pick up the first order.

13. The non-transitory computer-readable medium of claim 8, wherein the identification of the first order as being ready for pickup and the first threshold distance are transmitted to the first user device.

14. The non-transitory computer-readable medium of claim 8, wherein the execution of the computer-readable instructions by the one or more processors further cause the processing device to:
receive notification from the local pickup device that the order has been picked up; and transmit a message to one of the user devices confirming that the order has been picked up.

15. An apparatus comprising:
a processing device; and
a memory coupled to the processing device, the memory storing instructions which, when executed by the processing device, cause the apparatus to:
receive an indication that a first order associated with a user account is ready for pickup;
transmit one or more messages to user devices associated with the user account in response to the received indication that the first order is ready, the one or more messages including an identification of the first order as being ready for pickup, a pickup location for the first order, a first threshold distance from the pickup location for the first order, and a second threshold distance from the pickup location;
receive, as part of a response to the one or more messages, a designation of a first user device from among the user devices for tracking to the pickup location for picking up the order;
receive first location data at a limited interval from the first user device in response to the first user device determining that the first user device is outside of the first threshold distance from the pickup location and within the second threshold distance from the pickup location, wherein no location data is received from the first user device while the first user device is outside of the second threshold distance,
wherein the limited interval at which the first location data is received is based on detecting a threshold change in a location of the first user device while the first user device is outside of the first threshold distance and within the second threshold distance;
receive second location data at a more frequent interval than the limited interval in response to the first user device determining that the first user device is within the first threshold distance, wherein a periodicity of the more frequent interval at which the second location data is received is modified based on a threshold change in a location of the first user device inside the first threshold; and
transmit the second location data to a local pickup device to trigger an alert in response to receiving an indication that the first user device is approaching the pickup location.

16. The apparatus of claim 15, wherein the one or more messages include a first message to the user devices indicating an update of order status, and wherein the execution of the instructions further cause the apparatus to:
receive a request from one of the user devices for orders that are ready for pickup, wherein the identification of the first order, the pickup location, and the first threshold distance are transmitted in a second message in response to the request.

17. The apparatus of claim 16, wherein the second message transmitted in response to the request further includes an identification of a second order as being ready for pickup, a pickup location for the second order, and a second threshold distance from the pickup location for the second order.

18. The apparatus of claim 15, wherein the transmitting of the second location data to the local pickup device is in response to one or more requests for location updates from the local pickup device.

19. The apparatus of claim 15, wherein the execution of the instructions further cause the apparatus to:
receive the first order from a second user device of the user devices;
receive a request from the second user device to grant permission to the first user device to be used to pick up the first order.

20. The apparatus of claim 19, wherein the identification of the first order as being ready for pickup and the first threshold distance are transmitted to the first user device.

* * * * *